Patented Sept. 18, 1945

2,384,960

UNITED STATES PATENT OFFICE 2,384,960

CHEMICAL COMPOSITION

Gerald E. Phillips, Cranford, N. J., assignor to Standard Oil Development Company, a corporation of Delaware No Drawing. Application April 2, 1942,
Serial No. 437,361

2 Claims. (Cl. 252—51.5)

The present invention relates to improved oil compositions and, in particular, it relates to so-called "cutting oils" which oils are employed as a cooling and/or lubricating and protecting agent during the machining of metals, particularly hard metal alloys of the austenitic type. These alloys are iron alloys of high chromium, nickel, and in some cases high molybdenum content and are characterized by being difficult to machine on shapers, lathes, etc. As distinguished from ordinary steel the metal does not readily tear away ahead of the cutting tool but tends to drag onto the tool even to the extent, in the extreme cases, of forcing the tool to actually cut the metal. This dragging action creates more friction on the tool and makes it more difficult to lubricate the tool face and carry away the generated heat.

Heretofore cutting oils have been made by preparing an oil and water emulsion of a suitable oil which is then applied to a work piece which is undergoing machining, such as cutting, threading, and similar operations performed on shapers, lathes, milling machines, and the like, in ordinary machine shop practice. Also, in this same connection, turpentine has been previously used as a cutting aid in operations of the type indicated to protect the tool during the cutting of a hard metal. When using the above mentioned cutting acids, it is necessary to slow down the work to a large degree to prevent damage to the cutting tool. On lathe work, for example, it is possible to cut at only one-half to one-fourth as fast when cutting austenitic alloys as compared with cutting ordinary carbon steel.

I have now found that I may prepare a cutting fluid which is superior to known cutting aids in many respects, particularly with regard to the length of time the cutting tool may be used and the speed at which the operation may be performed. I have found that certain materials are adapted to cause a lubricant to adhere firmly to the metal surfaces and thereby reduce the friction caused by the cutting action. This in turn reduces the amount of heat generated. The alkyl amines are particularly efficient for this purpose although the hydroxylated amines and aromatic amines may also be used. These amines have a varying solubility in hydrocarbon oils depending on their structure and molecular weight. In some cases it is necessary to employ a mutual solvent such as for example an alcohol when it is desired to incorporate more of the amine than would be soluble in the hydrocarbon being used. The alcohol also serves as an efficient coolant. Isopropyl alcohol is particularly suitable as a mutual solvent since it also is a wetting agent for iron, steel and other material.

It is therefore the main object of my present invention to provide an improved cutting fluid which will protect a cutting tool contacting a hard metal for a greater period of time than prior used cutting oils.

It is a more specific object of my invention to provide a cutting fluid which may be used to protect a cutting tool against injury when operating on a hard metal, even though the cutting operation be performed at a high rate of speed.

Other and further objects of my invention will appear from the following more detailed description.

In order to illustrate my invention more fully, the following specific examples are set forth, with the understanding that the precise details therein set forth are merely illustrative and do not impose any limitation on my invention.

Example 1

I prepare a cutting fluid by mixing in the cold

| | Parts |
|---|---|
| Alcohol (isopropyl) | 75 |
| Triethanol amine | 25 |

Example 2

Another composition giving good results is the base oil containing 60 parts by weight of "Varsol" which is a virgin petroleum naphtha having a boiling range of approximately 300–400° F. To this base oil, I add 30 parts by weight of isopropyl alcohol and 10 parts by weight of triethanolamine.

Example 3

Another composition prepared in the cold and giving good results is the following: 94 parts by weight of a light lubricating oil having a Saybolt viscosity of 75 at 100° F. To this base oil, I add 0.5 part by weight of oleic acid; 1.4 parts by weight of sulfur; 4.0 parts by weight of butylamine; and 0.1 part by weight of pine tar.

Example 4

Another example giving good results is a cutting oil containing 51 parts by weight of a light mineral oil having a Saybolt viscosity of 100 at 100° F. To this base oil, I add 21 parts by weight of sulfonated castor oil; 9 parts by weight of common rosin; 1 part by weight of solid sodium hydroxide; 4 parts by weight of iso-propyl alcohol;

4 parts by weight of water and 10 parts by weight of benzylamine.

The rosin is added to the mineral oil and heated to dissolve the rosin. The caustic is dissolved in this water and then added to the rosin-oil mixture and agitated for a short time while still hot. The sulfonated oil is next added, the mixture allowed to cool and finally the alcohol and benzylamine are thoroughly incorporated. The product is a fluid mixture adapted to be diluted with water to form an emulsion containing the desired concentration of the oily mixture.

In a practical example, it was found that a lathe job of cutting "Hastelloy" metal which is an austenitic employing turpentine as a cutting aid required 2½ hours. When employing the composition of Example 2, the identical cutting job was accomplished in ¾ of an hour. Examination of the tool which was operated at the full cutting speed of the lathe, in the case where the composition of Example 2 was used as the cutting fluid, showed no injury whatever to the tool. In the case where turpentine was used as the cutting oil, the lathe speed was limited and the face of the cutting tool was damaged after ½ hour of operation.

In another practical example a given piece of work could be turned out of carbon steel on the lathe in one hour when using a typical cutting oil. The same job, on the same lathe and using the same cutting oil required three hours when using "Hastelloy." By substituting the cutting fluid described in Example 2 the "Hastelloy" job was finished in 1 hour which was performed at the full speed of the lathe.

Having described my invention and the preferred mode of practicing the same, I wish to point out that many modifications falling within the spirit thereof may be made by those familiar with this art; for example, instead of ethyl or isopropyl alcohol, I may employ any mono-hydric or poly-hydric alcohol, such as ether butyl, the glycols, and even glycerine. Also, instead of using triethanolamine, I may use any aliphatic amine, an aromatic amine, or any hydroxylated amine. It should be pointed out that the aliphatic amines containing from 6-8 atoms are sufficiently soluble in mineral oil for the purpose intended herein. In place of "Varsol" I may use kerosene or distillates boiling in the gas oil and/or light lubricating oil range. It is also pointed out that, if desired, the cuting oils hereinbefore enumerated or their equivalents may with good results be emulsified in water according to known technique and used in that form for the purposes intended.

What I claim is:

1. A metal cutting lubricant and coolant consisting essentially of isopropyl alcohol and an amine selected from the group consisting of alkyl amines, hydroxylated amines and aromatic amines in a ratio of about 1 to 7.5 parts by weight of amine to 3 parts by weight of isopropyl alcohol.

2. A cutting oil composition consisting essentially of a major proportion of a base mineral oil and a minor proportion sufficient in amount effectively to act as a coolant and lubricant of an amine selected from the group consisting of alkyl amines, hydroxylated amines and aromatic amines, and a minor proportion of isopropyl alcohol sufficient in amount to make a homogenous liquid product, the ratio of amine to isopropyl alcohol in parts by weight being about 1-7.5 to 3.

GERALD E. PHILLIPS.